United States Patent [19]

Lieberherr et al.

[11] 4,427,552
[45] Jan. 24, 1984

[54] METHOD OF AUTOMATICALLY CONTROLLING A CONTINUOUSLY OPERATING PRESSURE FILTER

[75] Inventors: Jürg Lieberherr, Zumikon; Ernst Rebsamen, Thalwil; Felix Trachsel, Windisch; Ludwig Huser, Niederrohrdorf, all of Switzerland

[73] Assignee: Sulzer-Escher Wyss Limited, Zurich, Switzerland

[21] Appl. No.: 461,473

[22] Filed: Jan. 27, 1983

[30] Foreign Application Priority Data

Feb. 9, 1982 [CH] Switzerland .......................... 774/82

[51] Int. Cl.³ ............................................. B01D 33/40
[52] U.S. Cl. .................................. 210/741; 210/744; 210/780
[58] Field of Search .............. 210/739, 740, 741, 744, 210/745, 780, 107, 108

[56] References Cited

U.S. PATENT DOCUMENTS

| | | | |
|---|---|---|---|
| 2,152,900 | 4/1939 | Manning | 210/780 |
| 3,523,077 | 8/1970 | Camihans et al. | 210/739 |
| 3,957,637 | 5/1976 | Morey | 210/741 |
| 4,042,503 | 8/1977 | Justus . | |
| 4,267,060 | 5/1981 | Miller | 210/741 |
| 4,343,708 | 8/1982 | Rantanen et al. | 210/744 |

FOREIGN PATENT DOCUMENTS

| | | |
|---|---|---|
| 38643 | 10/1981 | European Pat. Off. . |
| 2459587 | 10/1975 | Fed. Rep. of Germany . |
| 2558682 | 3/1980 | Fed. Rep. of Germany . |
| 1601097 | 8/1970 | France . |

*Primary Examiner*—John Adee
*Attorney, Agent, or Firm*—Werner W. Kleeman

[57] ABSTRACT

In the method of automatically controlling a continuously operating pressure filter, into which a suspension to be separated is introduced and from which a separated filtrate and a formed product, i.e. a concentrated suspension, are removed, a tolerated constant operating pressure is maintained in a filtering chamber of the pressure filter. During operation the transmission or throughput capacity of the filtering walls in the filtering chamber gradually decreases with increasing operating time of the pressure filter. To maintain, during operation, a constant ratio of the proportions of dry solid and liquid in the product the flow of suspension and the flow of product are regulated during operation in accordance with the result of measuring the transmission or throughput capacity of the filtering walls. Each time when a decrease is detected each of the two flows is reduced by the same coefficient which is directly proportional to the respectively detected decrease in the transmission capacity. Consequently, a desired ratio of the flow of suspension and of the flow of product which is present at the beginning of the operation is maintained constant during operation and remains constant. Measurement of the transmission or throughput capacity is accomplished by measuring either the respective flow of filtrate or by measuring the tolerated operating pressure. Advantageously the suspension to be separated is introduced and the product to be removed is removed volumetrically positively by means of regulatable metering pumps.

11 Claims, 4 Drawing Figures

METHOD OF AUTOMATICALLY CONTROLLING A CONTINUOUSLY OPERATING PRESSURE FILTER

BACKGROUND OF THE INVENTION

The present invention relates to a new and improved method of automatically controlling a continuously operating pressure filter.

In its more particular aspects the method for the automatic control of a pressure filter according to the invention is of the type including the steps of introducing a flow of a suspension at a first rate of flow into a filtering chamber formed in the pressure filter and comprising filtering walls; removing a flow of a filtrate at a second rate of flow from the filtering chamber; removing a flow of a product at a third rate of flow from the filtering chamber; maintaining a constant tolerated operating pressure within the filtering chamber, wherein the transmission or throughput capacity of the filtering walls in the filtering chamber gradually decreases with increasing operating time of the pressure filter.

Filters of this type are known, for example, from U.S. Pat. No. 3,797,662, German Patent Publication No. 2,054,968, U.S. Pat. No. 4,066,554, and German Patent No. 2,558,682.

Such pressure filters comprise an annular filtering chamber defined by cylinder-shaped filtering walls. The filtering walls may be rotated relative to each other, resulting in the formation of turbulence in the suspension to be separated and contained in the filtering chamber, so that a certain self-cleaning effect is obtained at the filtering walls. Thus, a solid cake is more slowly formed on the filtering surfaces in comparison to other pressure filters. But even in pressure filters of this kind the transmission or throughput capacity of the filtering walls continuously decreases with progressive operating time and with the growing solid cake layer. During the separation of a suspension into a filtrate and a product, which is a concentrated suspension, a constant quality of the product is required during the operating time. In other words, a constant ratio of the proportion of dry solids to the liquid contained in the product is desired.

Up to now this postulate has remained unfulfilled when using conventional regulating methods. A constant amount of suspension per unit time, that is a constant flow of suspension having constant quality, i.e. having a constant ratio of the amount of dry solids and the amount of liquid therein is introduced into the pressure filter. In the filtering or filtration chamber a constant operating pressure is maintained by restricting the outflow of the product. With continuously decreasing transmission capacity of the filtering walls a continuously decreasing amount of the filtrate to be separated is removed through the filtering walls, so that a continuously greater amount of liquid remains in the filtering chamber and is removed as a proportion of the product together therewith. This implies that the product becomes continuously diluted with a continuously deteriorating ratio of the proportion of dry solids and liquid in favor of the latter. To a certain extent the continuously deteriorating quality of the product is tolerated in the methods presently in use. Upon reaching the limit of tolerance the operation is stopped and the transmission or throughput capacity of the filtering walls is restored, for example, by means of flushing and the operation is again resumed.

SUMMARY OF THE INVENTION

Therefore, with the foregoing in mind it is a primary object of the present invention to provide a new and improved method of automatically controlling a continuously operating pressure filter in such a manner that the product quality, i.e. the ratio of the proportion of dry solids to the proportion of liquid in the product, remains constant through the entire operating time.

Now in order to implement this and still further objects of the invention, which will become more readily apparent as the description proceeds, the method of the present development is manifested by the features that, the transmission capacity of the filtering walls is measured, that the first rate of flow of the suspension and the third rate of flow of the product are regulated in accordance with the measured value of the transmission capacity of the filtering walls during operation, that the flow of suspension and the flow of product are each reduced by the same coefficient in correspondence to a measured decrease in the transmission capacity, the coefficient being directly proportional to the momentarily measured decrease, whereby a desired and originally present ratio of the flow of suspension to the flow of product is maintained constant during operation and remains constant.

According to this method, the flow of suspension is introduced into the pressure filter at such a rate that the flow of suspension can be processed at the instantaneously prevailing transmission capacity and at the efficiency of the filtering walls in the desired original proportion. The desired constant ratio of the dry solids proportion to the liquid proportion in the product is thus achieved and is maintained throughout the entire operating time.

Advantageously the method is conducted by measuring the transmission or throughput capacity of the filtering or filtration walls by measuring the magnitude of the flow of filtrate passed through the filtering walls, wherein a decrease in the flow of filtrate signifies a decrease in the transmission capacity, while the ratio of the flow of suspension to the flow of product and the operating pressure are maintained constant. With advantage, the method also may be conducted by measuring the transmission or throughput capacity of the filtering walls by measuring the magnitude of the tolerated operating pressure prevailing in the filtering chamber, wherein an increase in the operating pressure towards the upper limiting tolerance value signifies a decrease in the transmission capacity while the ratio of the flow of suspension and the flow of product and the operating pressure are maintained constant.

It is also possible and advantageous to derive one correcting or adjustment variable to reduce both the flow of suspension and the flow of product in accordance with the measured decrease in the transmission capacity of the filtering walls by measuring the flow of filtrate as well as from the result of measuring the tolerated operating pressure.

In performing the method it is of advantage if the suspension is introduced and the product is removed positively volumetrically by means of regulatable metering pumps, whereby the output or feed capacity of the metering pumps is regulated in accordance with the measured decrease in the transmission or throughput of the filtering walls.

The automatic control is simplified by using dually regulatable metering pumps which are regulatable with respect to their metering or dosing chambers and with respect to their rotational speed, by drivingly connecting the metering pumps to a drive motor having regulatable rotational speed and by conjointly regulating the rotational speed of the metering pumps by regulating the rotational speed of the common drive motor, whereby the ratio of the flow of suspension to the flow of product which is to be maintained constant is obtained by adjusting the metering chambers.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
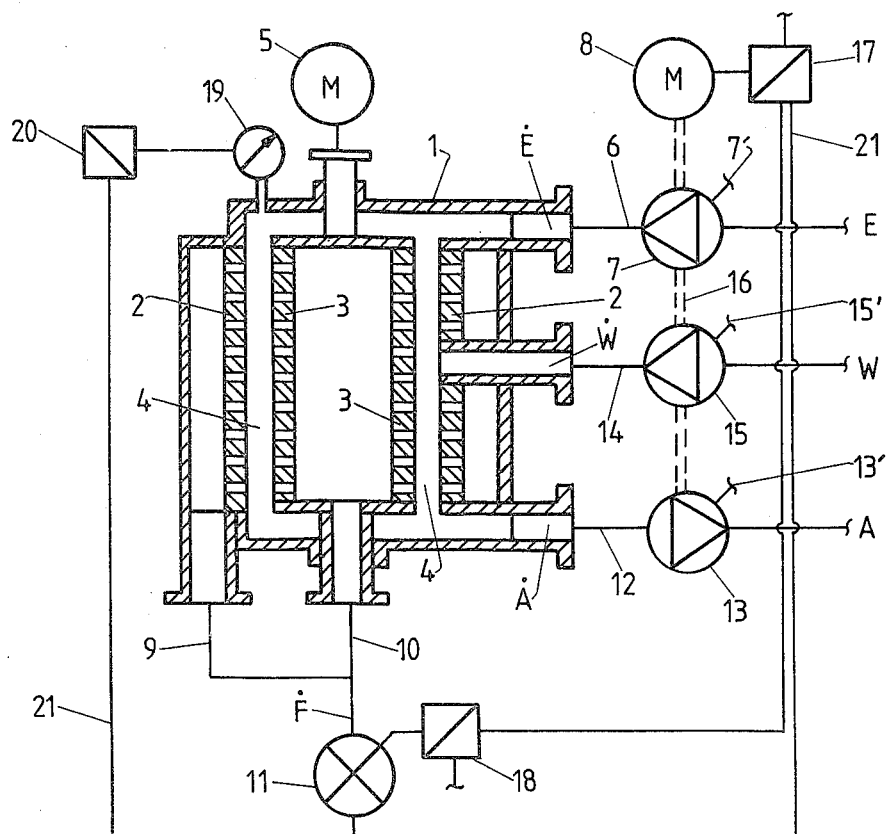
FIG. 1 is a schematic representation of a pressure filter including a control system to carry out the method according to the invention.

It is to be understood that in order to simplify the illustration only enough of the construction of the pressure filter has been shown as needed for those skilled in the art to readily understand the underlying principles and concepts of the present invention. Turning now specifically to FIG. 1 of the drawings, a pressure filter of known construction will be seen to comprise a housing 1 in which two substantially cylinder-shaped filtering walls or surfaces 2 and 3 which are rotatable with respect to each other define an annular filtering or filtration chamber 4. The inner filtering wall 3 may be rotated by means of a suitable drive motor 5. A suspension to be separated having a constant quality, that is, having a constant ratio of the dry solids proportion to the liquid proportion, is introduced into the filtering or filtration chamber 4 through a conduit 6 in a flow of suspension $\dot{E}$. This suspension flow $\dot{E}$ is delivered volumetrically by means of a regulatable metering pump 7 driven by drive motor 8. A filtrate to be separated penetrates the filtering walls 2 and 3; the filtrate is collected and drained through filtrate conduits 9 and 10. A volumetric measuring device 11 is connected to the conduits 9 and 10 for measuring a flow of filtrate $\dot{F}$. A pressure gauge 19 is provided to measure the operating pressure in the filtering chamber 4. A product which forms a concentrated suspension is drained from the filtering chamber 4 by means of a product conduit 12 and forms a flow of product $\dot{A}$. The flow of product $\dot{A}$ is determined volumetrically by a metering pump 13 and it is regulated thereby. For washing the product a wash liquid is introduced into the filtering chamber 4 through a conduit 14. The wash liquid is determined volumetrically and regulated by a metering pump 15 delivering a flow of wash liquid $\dot{W}$. All the three metering pumps 7, 13 and 15 are coupled to a shaft 16 extending from the drive motor 8 and all such three metering pumps 7, 13 and 15 are commonly or conjointly driven thereby.

The three metering pumps 7, 13 and 15 are dually regulatable metering pumps, the output or feed capacity of which is changed, firstly, by varying their metering chamber, for example, by varying the stroke and, secondly, by varying their rotational speed. A desired ratio of the flow of suspension $\dot{E}$ to be introduced, of the flow of wash liquid $\dot{W}$ and of the flow of product $\dot{A}$ is obtained at the dually regulatable metering pumps by adjusting the metering chambers by using a suitable adjustment or setting element 7' or 13' or 15', respectively. The amount to be respectively delivered per unit of time which is the concrete flow, is obtained by adjusting the rotational speed of the metering pumps 7, 13 and 15. Since all the metering pumps are coupled to a common shaft, namely the shaft 16 of the drive motor 8, the flow of suspension, the flow of wash liquid and the flow of product is regulated with a respectively constant mutual ratio of the variables mentioned by regulating the rotational speed of the drive motor 8 by means of a variometer 17. The regulating system for the rotational speed of the drive motor 8 including the variometer 17 is connected to a correcting variable or adjustment transmitter 18 in which the respective correcting variable or adjustment magnitude is derived from the result of the measurement obtained in the measuring means 11 for measuring the flow of filtrate $\dot{F}$. In parallel thereto and in an equivalent manner the correcting variable or adjustment magnitude for the variometer 17 may be derived from the result of measuring the operating pressure p in the filtering chamber 4 which is also illustrated in the drawing. Therefore, a pressure gauge 19 is connected to the filtering chamber 4 and the correcting variable or adjustment transmitter 20 is connected in series thereto and forwardly of the variometer 17.

Applying the principle according to the invention, namely maintaining a respectively constant ratio between the flow of suspension $\dot{E}$ (plus the flow of wash liquid $\dot{W}$) and the flow of product $\dot{A}$, it is possible in principle to carry out the method according to the invention using either one of the two measuring and regulating systems or using a combination of the two systems as described hereinbefore.

According to the aforementioned principle and at constant flows $\dot{E}$ and $\dot{A}$ the decrease in the transmission or throughput capacity of the filtering walls 2 and 3 which occurs during the course of time and which is due to the adherence of solid particles to the filtering walls becomes manifest practically simultaneously by virtue of the decrease in the flow of filtrate $\dot{F}$ and by the increase of the pressure p in the filtering chamber 4. The increase in the pressure, which may be permissible within a range of tolerance, will positively result in an increase in the flow of filtrate, which means that the effective flow of filtrate may remain equally strong through some period of time, so that during this period of time the decrease in the transmission capacity of the filtering walls cannot be detected by measuring the flow of filtrate. If the permissible upper tolerance limit for the pressure in the filtering chamber is exceeded, this will include the risk of damage to the pressure filter, for example, to the filtering walls 2 and 3 due to the excess pressure. Thus, the regulation of the flows $\dot{E}$ and $\dot{A}$ merely by measuring the flow of filtrate over a longer period of operation only may be applied to suspensions which may be well filtered. Also, in such cases the regulating systems for safety reasons should be combined with a pressure monitoring system provided at least with a stop switch effect for the drive of the metering pumps 7 and/or 15, respectively, when reaching an upper tolerance limit for the permissible operating pressure in the filtering chamber 4.

Measuring or, respectively, monitoring the pressure in the filtering chamber is thus finally decisive and the regulation and reduction, respectively, of the flows $\dot{E}$ and $\dot{A}$ only can be derived from the result of such measurement provided that measurement of the effective flow of filtrate $\dot{F}$ can be or will be dispensed with.

The method according to the invention also may be realized with a different regulation aggregate or assembly. Thus, simple metering pumps regulatable only in respect of their rotational speed also may be used, each of which would be driven by an associated drive motor regulatable in respect of rotational speed. The apparatus design of the required regulation system therefore does not have to be described separately here. In comparison to the apparatus as described hereinbefore the equipment would have to be tripled, for example.

It also would be possible in accordance with the invention to drivingly connect the two metering pumps 7 and 15 for the flows $\dot{E}$ and $\dot{W}$, respectively, to a common drive motor and to regulate the flow of product $\dot{A}$ by a regulatable throttling device or means. For monitoring the effective flow of product obtained by throttling, it is necessary to connect a measuring device measuring the flow of product after the throttling means in order to control the flow and connected with a secondary correcting variable or adjustment magnitude transmitter reactively affecting the throttling means. This arrangement, also, is not further indicated in the drawings since it represents an alternative which is easily imagined in the field of automatic control.

For simplicity, the method according to the invention is described in the following examples only as an automatic control based on measuring the effective flow of filtrate $\dot{F}$ at constant operating pressure p.

The pressure filter as described including the regulation assembly or aggregate operates as follows:

A separating process is initiated by firstly adjusting a flow of suspension $\dot{E}$, a flow of wash liquid $\dot{W}$, and a flow of product $\dot{A}$ to desired values. Therefrom, an operating pressure p in the filtering chamber 4 and a flow of filtrate $\dot{F}$ penetrating the filtering walls 2 and 3 will result. The pressure filter and installation operates in such a way that the flow of suspension $\dot{E}$ plus the flow of wash liquid $\dot{W}$ is equal to the flow of product $\dot{A}$ removed and the flow of filtrate $\dot{F}$ separated; $\dot{E}+\dot{W}=\dot{A}+\dot{F}$. Therein, a desired ratio of the supplied flows $\dot{E}+\dot{W}$ to the flow of product $\dot{A}$, i.e. $(\dot{E}+\dot{W})/\dot{A}$, is present which determines the degree of concentration in the product, i.e. the desired quality thereof. The flow of filtrate $\dot{F}$ is continuously measured in the measuring device 11. The measured value of the instantaneously measured actual flow of filtrate $\dot{F}'$ is compared to the initially present value of the flow of filtrate $\dot{F}$ which is the comparison value. The flow of suspension, the flow of wash liquid and the flow of product are reduced in the same sense and proportionally to the difference detected, i.e. to the ratio of the instantaneous actual flow of filtrate to the initially present flow of filtrate $\dot{F}'/\dot{F}$. Designating the ratio $\dot{F}'/\dot{F}$ as a coefficient k, with $k=\dot{F}'/\dot{F}$, thus instantaneous flows $\dot{E}'=\dot{E}\cdot k$, $\dot{W}'=\dot{W}\cdot k$ and $\dot{A}'=\dot{A}\cdot k$ are adjusted. If the pressure filter is operating in the beginning according to $\dot{E}+\dot{W}=\dot{A}+\dot{F}$, the instantaneous operation of the pressure filter will be represented by $\dot{E}'+\dot{W}'=\dot{A}'+\dot{F}'$, wherein the ratio $\dot{E}/\dot{A}$ is maintained, i.e. $\dot{E}/\dot{A}=\dot{E}'/\dot{A}'$. This occurs continuously throughout the operating time of the pressure filter, so that the quality of the product remains constant.

The proportional reduction in the flow of suspension, in the flow of wash liquid and in the flow of product is achieved by reducing the initial rotational speed $\dot{N}$ of the drive motor 8 to a rotational speed $\dot{N}'$, in this case proportionally to the coefficient k, so that $\dot{N}'=\dot{N}\cdot k$. Therefore, a signal is fed to the variometer 17 by the correcting variable or adjustment magnitude transmitter 18 in which this signal is derived from the measured ratio $\dot{F}'/\dot{F}$.

Figure 2:
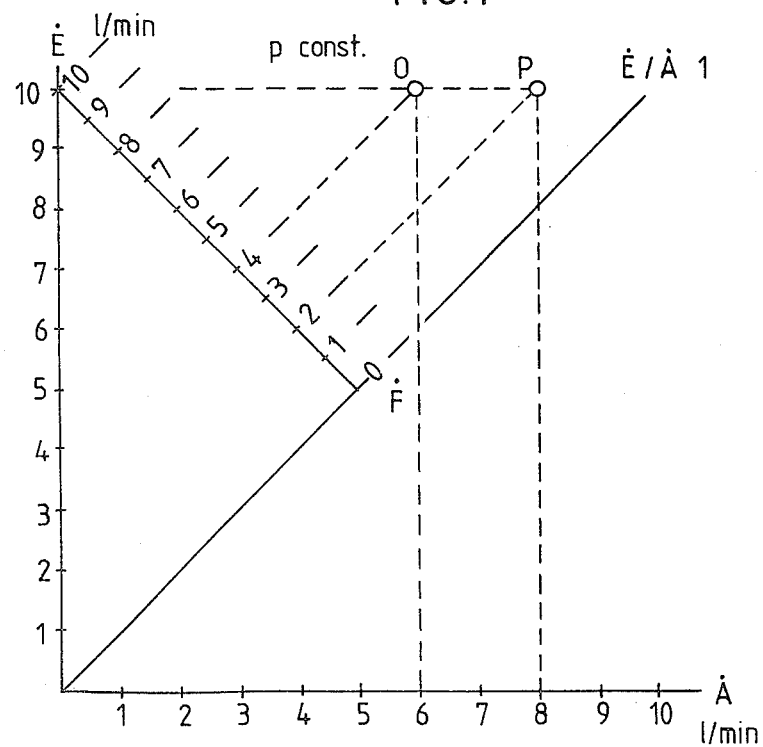
FIG. 2 is a diagram explaining a heretofore used method.

To further emphasize the advantages achievable by the method according to the invention a heretofore conventional regulation of the pressure filter is initially described with reference to a first example: accordingly, as shown in the diagram of FIG. 2, a suspension is to be concentrated by separating 40% thereof as filtrate. This is actually the case in the beginning when the suspension is introduced at a suspension flow rate of 10 l/min. and when the flow rate of filtrate is 4 l/min. and the flow rate of product is 6 l/min. This state is indicated at the point O in the diagram. Constant pressure p is maintained in the filtering chamber by restricting the product flow. Due to decreasing transmission of the filtering walls the flow of filtrate decreases to a value of 2 l/min. Additional 2 l/min of liquid remain in the filtering chamber and, if the constant pressure p is maintained, will be removed together with the flow of product. The product is thus diluted by 2 l/min., the rate of product flow thus has grown to 8 l/min. and the product now comprises an excess of 30% more liquid than at the beginning. During operation, the quality of the product deteriorated continuously in correspondence with the change in the ratio of the flow of suspension $\dot{E}$ to the flow of product $\dot{A}$, i.e. $\dot{E}/\dot{A}$, $\dot{E}/\dot{A}=10/6=1.66$ to $\dot{E}'/\dot{A}'=10/8=1.25$. This state is represented in the diagram of FIG. 2 by the point P.

Figure 3:
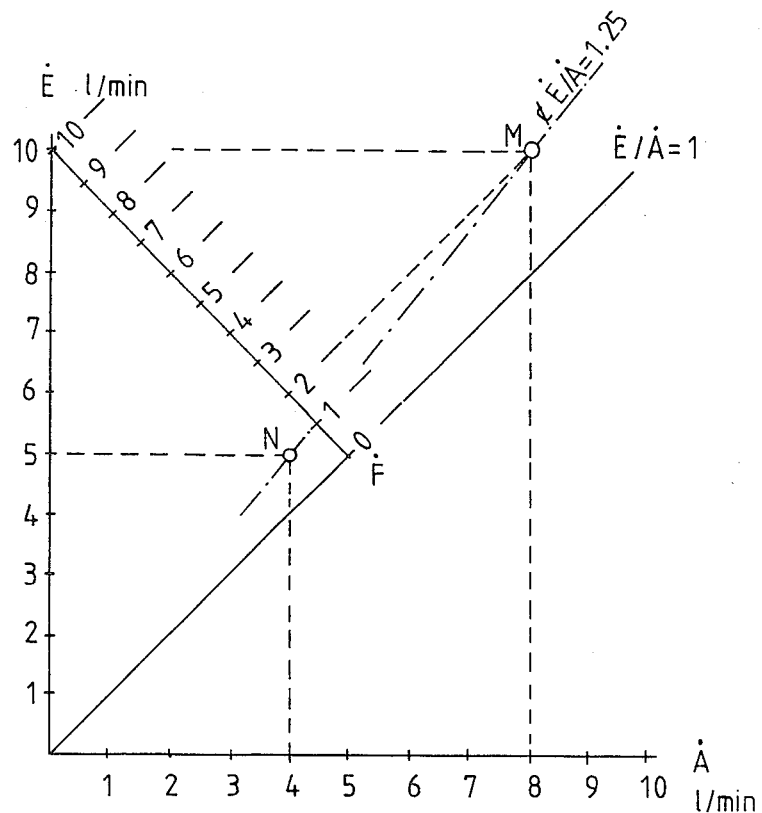
FIG. 3 is a diagram serving to explain an embodiment of the method according to the invention.

In another example the separating process is regulated according to the invention and it is intended to remove 20% from a suspension as a filtrate. This process is illustrated in the diagram of FIG. 3. At the beginning the flow rate of the suspension $\dot{E}$ is 10 l/min. and the suspension is fed into the pressure filter at this rate. In the filtering chamber a constant operating pressure $p=¢$ is maintained, which is effected by positively volumetrically introducing the suspension and by volumetrically removing the product by means of the metering pumps.

Figure 4:
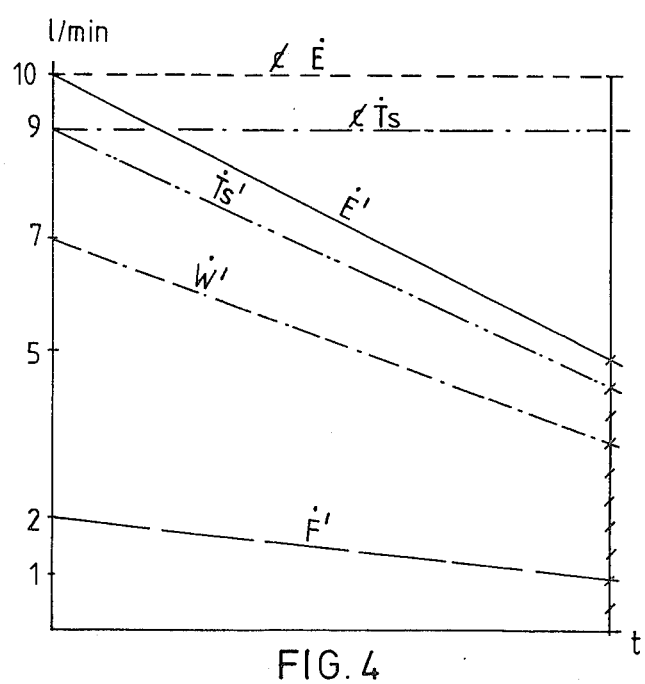
FIG. 4 is a diagram explaining the differences between the conventional method and the method according to the invention.

In the initial state there is a filtrate rate of flow $\dot{F}=2$ l/min. at a suspension flow rate of $\dot{E}=10$ l/min. and at a product flow rate of $\dot{A}=8$ l/min. The flow of suspension $\dot{E}$ and the flow of product A thus are in a desired ratio of $\dot{E}/\dot{A}$ equal to $10/8=1.25$. This state is represented in the diagram of FIG. 3 by the point M. A gradually decreasing flow of filtrate is measured continuously and the flow of suspension $\dot{E}$ and the flow of product $\dot{A}$ are reduced according to the detected difference between the initially present flow of filtrate $\dot{F}$ and the instantaneously measured actual flow of filtrate $\dot{F}'$ in the same sense and proportionally to the ratio of the initially present flow of filtrate $\dot{F}$ and the measured instantaneous actual flow of filtrate $\dot{F}'$, i.e. proportionally to the ratio $\dot{F}'/\dot{F}$. If the reduced flow of suspension is $\dot{E}'=\dot{E}\cdot\dot{F}'/\dot{F}$ and if the reduced flow of product is $\dot{A}'=\dot{A}\cdot\dot{F}'/\dot{F}$, the originally desired and initially present ratio of the flow of suspension to the flow of product will always be the same, i.e. $\dot{E}/\dot{A}=\dot{E}'/\dot{A}'$. In the example shown in FIG. 3 the ratio is 1.25. The regulation is along the line which is indicated in the diagram by $c\dot{E}/\dot{A}=1.25$. If the flow of filtrate $\dot{F}'$ decreases from the original 2 l/min. to 1 l/min., i.e. to half the original flow of filtrate, the flow of suspension $\dot{E}'$ and the flow of product $\dot{A}'$ each will also become reduced to one half. This state is represented in the diagram of FIG. 3 by a point $\dot{N}$ which, like the point $\dot{M}$, is located on the same line of the constant ratio $c\dot{E}/\dot{A}=1.25$ since $\dot{E}/\dot{A}=10/8=1.25$ and $\dot{E}'/\dot{A}'=5/4=1.25$. After reaching the state indicated by point N the separating process is stopped and the transmission of the filtering walls is restored, for example, by means of flushing. During the entire time of operation states were assumed intermediate the points M and Ṅ and the product always had the same constant quality in respect of the ratio of dry solids to the liquid in the product. This advantage achieved over heretofore used methods in the method for automatic control according to the invention is additionally stressed with reference to a third example represented in the diagram of FIG. 4. Therein, the time course of a separating process is shown:

10 liters of the suspension to be separated contain 1 liter of dry solids and 2 liters of wash liquid. 20 percent thereof are intended to be separated as a filtrate, so that the product is intended to contain 12.5% of dry solids and 87.5% of liquid. In the process 10 l/min. of the aforementioned suspension are introduced into the pressure filter and 2 liters of filtrate are separated therefrom, so that the product amounts to 8 liters, 1 liter thereof being dry solids. The product thus comprises 12.5% of dry solids and 87.5% of liquid. During the separating process the flow of filtrate decreases gradually as shown by the line F' in FIG. 4 and amounts only to 1 l/min. after a period of time t. This gradually decreasing flow of filtrate $\dot{F}'$ is measured continuously and the flow of suspension $\dot{E}$, the flow of wash liquid $\dot{W}$ and the flow of product $\dot{A}$ are reduced in the same ratio as the instantaneous flow of filtrate $\dot{F}'$ to the initially present flow of filtrate $\dot{F}$, i.e. in the ratio $\dot{F}'/\dot{F}$, as shown in FIG. 4 by the lines $\dot{E}'$ and $\dot{W}'$. The restriction in the flow of suspension which has a constant proportion of dry solids in the suspension to be separated results in a restriction of the introduced amount of dry solids directly proportional thereto, as shown in FIG. 4 by the line Ts'. After the period of time t the flow of filtrate $\dot{F}'$ is 1 l/min. and thus, in comparison to the initially present flow of filtrate $\dot{F}$, $\dot{F}'/\dot{F}=\frac{1}{2}$, to half of the initially present flow of filtrate. Correspondingly, the flow of suspension $\dot{E}'$, the flow of wash liquid $\dot{W}'$ and the flow of product $\dot{A}'$ are each reduced to one half of the originally present flow, that is to 5 l/min. and 1 l/min. and 4 l/min., respectively. The amount of dry solids now is 0.5 l per each 4 l of product. The quality of the product, therefore, has remained the same as initially and comprises the original and desired 12.5% of dry solids and 87.5% of liquid. The ratio of the flow of suspension to the flow of product was maintained constant during the process and thus has remained the same after the period of time t; initially: 10/8=1.25, after the period of time t: 5/4=1.25.

For direct comparison with the method according to the invention FIG. 4 also shows the course of a conventionally regulated separating process. Therein, the flow of filtrate decreases in the same manner as indicated by the line $\dot{F}'$. After the period of time t the flow of filtrate $\dot{F}$ decreases from the initial 2 l/min. to 1 l/min. In this conventional regulating method just the operating pressure p is maintained constant. This will result in the flow of product increasing in correspondence to the decrease in the flow of filtrate. Thereby the proportion of liquid in the flow of product increases continuously, so that the product becomes increasingly diluted. At the beginning, a flow of suspension including a flow of wash liquid amounted to 10 l/min. and the flow of product to 8 l/min. including a proportion of 1 liter of dry solids, i.e. 12.5% of dry solids and 87.5% of liquid. After expiration of the time t the conditions are as follows, when the flow of suspension is maintained constant as shown by the lines $c\dot{E}$ and $cTs$: the flow of product $\dot{A}'$ now amounts to 9 l/min. and the product comprises now 1 liter of dry solids per 9 liters, i.e. 11% of dry solids and 89% of liquid. The quality of the product deteriorates gradually and the product becomes more and more dilute. The initially present ratio of the flow of suspension to the flow of product $\dot{A}$, which has been 10/8=1.25, has changed to 10/9=1.11 after the period of time t. $\dot{E}/\dot{A}\neq\dot{E}/\dot{A}'$.

While there are shown and described present preferred embodiments of the invention, it is to be distinctly understood that the invention is not limited thereto, but may be otherwise variously embodied and practiced within the scope of the following claims.

ACCORDINGLY,

What we claim is:

1. A method of automatically controlling a continuously operating pressure filter, said method comprising the steps of:
    introducing a flow of a suspension at a first rate of flow into a filtering chamber formed in said pressure filter and containing filtering walls;
    removing a flow of a filtrate at a second rate of flow from said filtering chamber;
    removing a flow of a product at a third rate of flow from said filtering chamber;
    maintaining a substantially constant tolerated operating pressure within said filtering chamber;
    the transmission capacity of said filtering walls in said filtering chamber gradually decreasing with increasing operating time of said pressure filter;
    measuring the transmission capacity of the filtering walls;
    during operation regulating said first and said third rate of flow in accordance with an obtained measuring result concerning said transmission capacity; and
    reducing each of said first and said third rate of flow by a same coefficient in correspondence to a measured decrease in said transmission capacity, said coefficient being directly proportional to the corresponding value of the measured decrease;
    whereby a desired ratio of said first and said third rate of flow is obtained at the beginning of the operation and is maintained essentially constant and remains essentially constant during operation.

2. The method as defined in claim 1, further including the steps of:
    measuring said transmission capacity of said filtering walls by measuring the magnitude of the flow of filtrate passing through said filtering walls; and
    wherein a decrease in said flow of filtrate signifies a decrease in said transmission capacity when said constant ratio of said flow of suspension to said flow of product and said operating pressure are maintained.

3. The method as defined in claim 1, further including the steps of:
  measuring said transmission capacity of said filtering walls by measuring the magnitude of said tolerated operating pressure prevailing in said filtering chamber; and
  whereby an increase in said operating pressure towards an upper limiting tolerance value signifies a decrease in said transmission capacity of said filtering walls, when said constant ratio of said flow of suspension and said flow of product is maintained.

4. The method as defined in claim 1, further including the steps of:
  deriving a correcting variable for reducing both said first rate of flow and said third rate of flow in accordance with the measured decrease in said transmission capacity of said filtering walls from the result of measuring said flow of filtrate as well as well as from the result of measuring said tolerated operating pressure.

5. The method as defined in claim 1, further including the steps of:
  introducing said suspension and removing said product positively volumetrically by using regulatable metering pumps; and
  regulating the output capacity of said metering pumps in accordance with said measured decrease in said transmission capacity of said filtering walls.

6. The method as defined in claim 5, further including the steps of:
  regulating the rotational speed of said metering pumps.

7. The method as defined in claim 5, further including the steps of:
  using dually regulatable metering pumps regulatable by changing a respective metering chamber thereof and by changing the rotational speed thereof;
  connecting said pumps to a drive motor having a regulatable rotational speed; and
  establishing said ratio of said flow of suspension to said flow of product to be maintained constant by adjusting said metering chambers.

8. The method as defined in claim 1, further including the steps of:
  additionally introducing a wash liquid into said filtering chamber of said pressure filter in order to wash said product formed in said chamber;
  adding said flow of wash liquid to said flow of suspension in order to maintain an essentially constant ratio of said flow of suspension plus said flow of wash liquid to said flow of product during operation;
  whereby the ratio of said flow of suspension to said flow of product is maintained constant during operation.

9. The method as defined in claim 8, including the steps of:
  introducing said suspension and removing said product positively volumetrically by using regulatable metering pumps;
  using a dually regulatable metering pump for introducing said wash liquid;
  drivingly connecting said metering pump to a drive motor driving said dually regulatable metering pumps for pumping said suspension and said product;
  conjointly regulating all of said metering pumps in the same rotational sense by regulating the rotational speed of said drive motor which is common to all of said metering pumps; and
  establishing said ratios of said flows to be maintained constant by adjusting metering chambers of said metering pumps.

10. The method as defined in claim 5, including the steps of:
  using a regulating assembly;
  coupling said metering pumps to a common drive shaft drivingly connected to a drive motor including regulating means for the rotational speed thereof;
  connecting said regulating means to a correcting variable transmitter; and
  deriving a correcting variable from the measured decrease in said transmission capacity of said filtering walls.

11. The method as defined in claim 8, further including the steps of:
  using dually regulatable metering pumps for introducing and for regulating said flow of suspension and said flow of wash liquid; and
  regulating said flow of product by means of regulatable, volumetrically controllable throttling means.

* * * * *